(No Model.)

E. H. FISH.
FEED MECHANISM FOR ENGINE LATHES.

No. 579,971. Patented Apr. 6, 1897.

Witnesses:
Henry C. Fish
Henry A. Stone

Inventor:
Elmer H. Fish

UNITED STATES PATENT OFFICE.

ELMER H. FISH, OF WORCESTER, MASSACHUSETTS.

FEED MECHANISM FOR ENGINE-LATHES.

SPECIFICATION forming part of Letters Patent No. 579,971, dated April 6, 1897.

Application filed August 10, 1896. Serial No. 602,260. (No model.)

*To all whom it may concern:*

Be it known that I, ELMER H. FISH, a citizen of the United States, residing at Worcester, in the county of Worcester and State of Massachusetts, have invented a new and useful Improvement in the Feed Mechanism of Engine-Lathes, of which the following is a specification.

My invention relates to improvements in the feed mechanism of engine-lathes in which the movement of the cutting-tool relative to the material operated upon is effected by two feed rods or screws.

The objects of my improvements are, first, to provide means for revolving either of the two feed rods or screws from the same source of power, and, second, to provide means for rotating one of the feed rods or screws at easily-varied speeds. I attain these objects by the mechanism illustrated in the accompanying drawings, in which—

Figure 1:
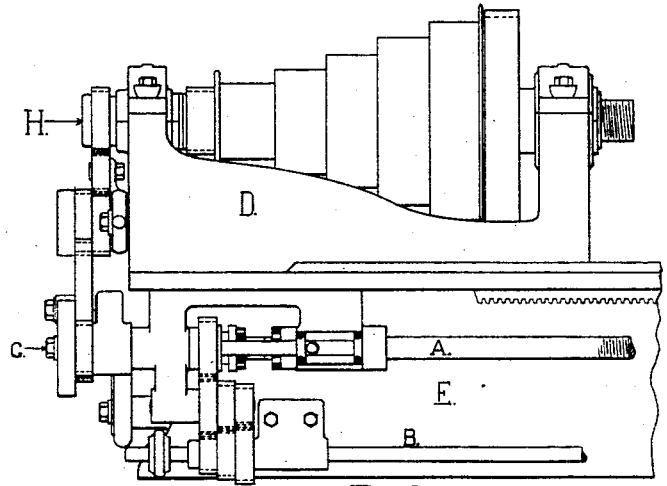
Figures 2, 3:
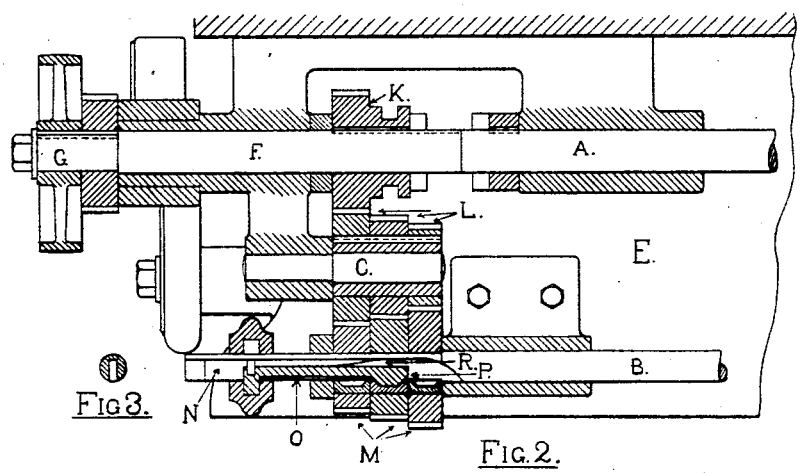

Figure 1 shows the feed mechanism in connection with so much of the lathe as is necessary to show how it is applied. Fig. 2 is a section through the two feed rods or screws A and B and the intermediate shaft or stud C, and Fig. 3 is a section of the feed-rod B at O.

Bed-plate E, head-stock D, and mechanism for imparting motion to shaft F by trains of gearing or belt connection from the main spindle H of the lathe are of ordinary construction and are not claimed as any part of this invention.

Feed rods or screws A and B are journaled in bearings fastened to or a part of bed-plate E. The short shaft F is also journaled in a bearing fastened to or a part of the bed-plate E, so as to form a continuation of feed rod or screw A. End G of shaft F is adapted to receive motion through trains of gearing or belts from the main spindle H of the lathe.

Upon shaft F there is placed a spur-gear K, having spline connection to shaft F, so that it may be rotated by shaft F and may be moved longitudinally upon said shaft.

Upon the gear K and on the face toward the feed rod or screw A are formed clutch-teeth adapted to engage mating clutch-teeth formed upon feed rod or screw A or upon a collar secured rigidly to said feed rod or screw A, so that by means of clutch-teeth formed upon gear K and clutch-teeth formed upon feed rod or screw A shaft F may impart its motion to said feed rod or screw.

Upon shaft or stud C are carried two or more (in this case three) gears L, arranged to rotate together. When gear K is in the position shown in the drawings, gears L will be rotated by shaft F through the medium of gear K.

Upon feed rod or screw B, and normally free to rotate upon said rod or screw, are placed gears adapted to be driven by corresponding gears L upon shaft or stud C. Means are provided as follows for temporarily driving feed rod or screw B by any one of the gears M.

Feed rod or screw B has cut in it a slot N, (shown in sectional view of shaft B at Fig. 3.) In said slot is fitted a key O, adapted to be moved longitudinally in rod or screw B. Means for moving key O will be easily provided by mechanics skilled in the building of machine-tools and are not claimed as any part of this invention.

End P of key O is formed as shown in the drawings, so that it will fit into the keyway to which it may be opposite in either of the gears M. Sufficient clearance is left between key O and the bottom of slot N to allow key O to be moved from one gear to another by riding over the ends of the keyway, thus making it possible to move said key from one gear to another without allowing it to engage more than one gear at a time and also making it possible by means of said clearance to move said key from end to end of its travel without waiting for it to come opposite the slots in each individual gear. Spring R is provided to force key O into the keyway to which it may be opposite.

What I claim as my invention, and desire to secure by Letters Patent, is—

1. In the feed mechanism of an engine-lathe, the combination of the shaft F adapted to be driven through connecting mechanism by the main spindle of the lathe, in continuation of, but independent of, the feed rod or screw A; combined gear and clutch K sliding upon shaft F but having spline connection therewith; clutch upon feed rod or screw A; shaft or stud C having two or more gears rotating upon it, feed rod or screw B having upon it two or more gears M engaging with corresponding gears L upon shaft or stud C; and a sliding key O carried in feed rod or screw B, capable of temporarily driving said feed rod or screw, substantially as described.

2. In the feed mechanism of an engine-lathe, the combination of the shaft F adapted to be driven through connecting mechanism by the main spindle of the lathe, in continuation of, but independent of, the feed rod or screw A; combined gear and clutch K sliding upon shaft F but having spline connection therewith; clutch upon feed rod or screw A; shaft or stud C having two or more gears rotating upon it; feed rod or screw B having upon it two or more gears M engaging with corresponding gears L upon shaft or stud C; and a sliding key O, carried in a slot N in the feed rod or screw B, said key having upon one side a projection adapted to engage in slots in each of the gears M, said slots being so formed that they do not extend to either face of said gears, substantially as described.

ELMER H. FISH.

Witnesses:
HENRY C. FISH,
HENRY A. STONE.